United States Patent [19]

Makita

[11] Patent Number: 4,839,895

[45] Date of Patent: Jun. 13, 1989

[54] EARLY FAILURE DETECTION SYSTEM FOR MULTIPROCESSOR SYSTEM

[75] Inventor: Akihisa Makita, Tokyo, Japan

[73] Assignee: NEC Corporation, Tokyo, Japan

[21] Appl. No.: 139,829

[22] Filed: Dec. 30, 1987

[30] Foreign Application Priority Data

Jan. 7, 1987 [JP] Japan ................................. 62-2235
Jan. 7, 1987 [JP] Japan ................................. 62-2236
Feb. 10, 1987 [JP] Japan ................................. 62-30156
Feb. 12, 1987 [JP] Japan ................................. 62-30915

[51] Int. Cl.$^4$ ............................................. G06F 11/22
[52] U.S. Cl. ........................................... 371/16; 371/9
[58] Field of Search ................ 371/16, 9, 11; 364/187, 364/184, 200 MS File, 900 MS File

[56] References Cited

U.S. PATENT DOCUMENTS

| | | | |
|---|---|---|---|
| 4,191,996 | 3/1980 | Chesley | 371/16 X |
| 4,377,000 | 3/1983 | Staab | 364/184 X |
| 4,553,201 | 11/1985 | Pollack | 371/16 X |
| 4,567,560 | 1/1986 | Polis | 371/16 X |
| 4,583,222 | 4/1986 | Fossum | 371/16 |
| 4,641,308 | 2/1987 | Sascarisen | 371/16 |
| 4,703,446 | 10/1987 | Momose | 371/16 X |

Primary Examiner—Jerry Smith
Assistant Examiner—Robert W. Beausoliel
Attorney, Agent, or Firm—Foley & Lardner, Schwartz, Jeffery, Schwaab, Mack, Blumenthal & Evans

[57] ABSTRACT

An early failure detection system for a multiprocessor system has a plurality of central processing units. When an idling central processing unit is detected by a microprogram stored in a control memory or a control memory controller, a test program for testing the idling central processing unit is executed before the idling central processing unit becomes busy. The test program is read out from a main memory and is executed using a register, an arithmetic circuit, an instruction advance fetching and decoding circuit, a main memory access control circuit, and the like. If a hardware failure of the idling central processing unit occurs during execution of the test program, the failed central processing unit is separated from the system so that the system can continue operation.

4 Claims, 6 Drawing Sheets

EARLY FAILURE DETECTION SYSTEM FOR MULTIPROCESSOR SYSTEM

BACKGROUND OF THE INVENTION

The present invention relates to an early failure detection system for a multiprocessor system and, more particularly, to an early failure detection system for testing a processor which is idling.

According to a typical conventional early failure detection system for a multiprocessor system, two processors are connected to an input/output unit and a test circuit through two switches. More specifically, when one processor is connected to the input/output unit, the other processor is set in the standby mode and connected to the test circuit.

However, in such a system, a processor can be tested only when it is in the standby mode, and an idling processor, that is, a processor waiting for a subsequent instruction cannot be tested. Therefore, when a processor fails during idling, the failure cannot be detected until the processor starts processing in accordance with a subsequent instruction. If the processing is related to the critical control of the system, the operation of the system is seriously undesirably affected.

When testing is to be performed for an idling processor using a conventional system, a complex test circuit is required. Also, it is difficult to detect a failure throughout a processor using a conventional system.

SUMMARY OF THE INVENTION

It is an object of the present invention to provide an early failure detection system for a multiprocessor system, which eliminates the above conventional drawbacks, which can be realized without using a complex test circuit, and which is efficient and can change the testing range.

According to the present invention, an early failure detection system for a multiprocessor system including a plurality of central processing units for microprogram control, comprises: means for detecting that a central processing unit is idling, means for storing a test program used for testing an idling central processing unit, means for executing the test program before the idling central processing unit becomes busy, and means for separating a failed central processing unit.

DETAILED DESCRIPTION OF THE PREFERRED EMBODIMENTS

Preferred embodiments of the present invention will be described in detail with reference to the accompanying drawings.

Figure 1:
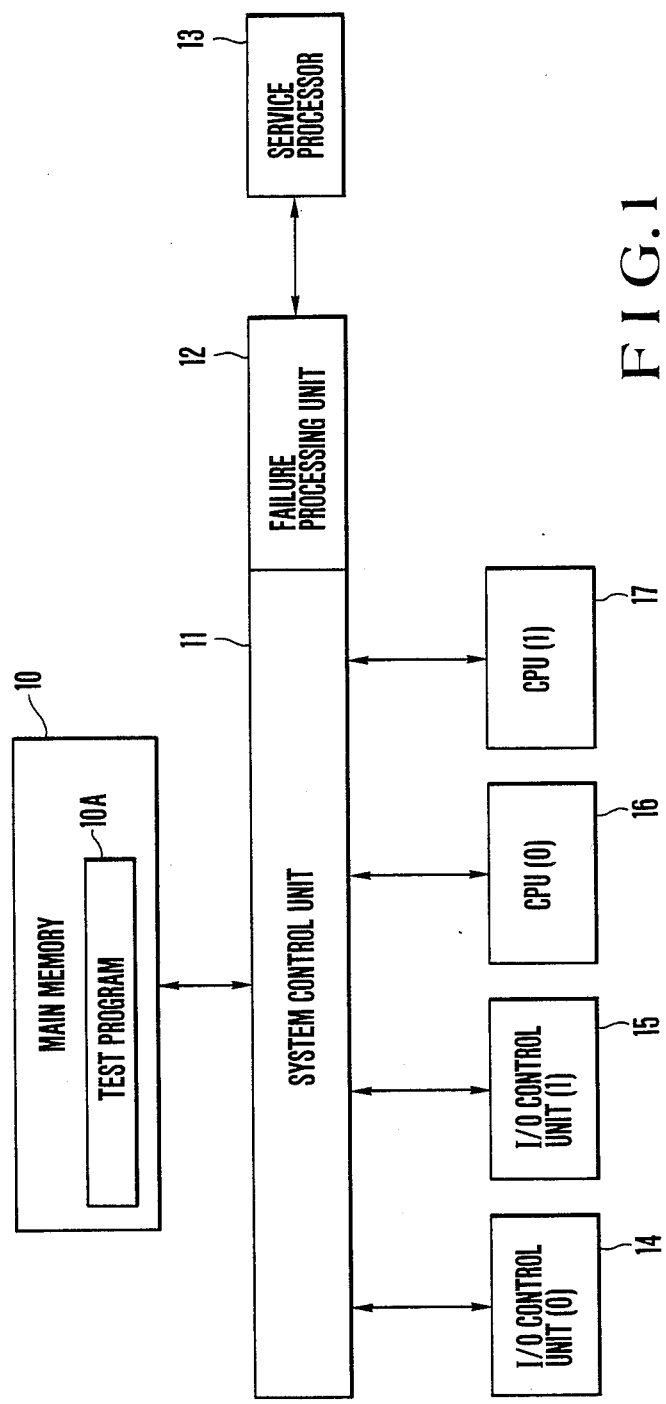
FIG. 1 is a block diagram of the entire arrangement of a system according to an embodiment of the present invention.

FIG. 1 is a block diagram of the entire arrangement of an early failure detection system, for a multiprocessor system, according to an embodiment of the present invention.

Referring to FIG. 1, a main memory 10, a system control unit 11, a failure processing unit 12, a service processor 13, an input/output (I/O) control unit (0) 14, an I/O control unit (1) 15, a central processing unit (CPU) (0) 17, and a CPU (1) 16 are connected to each other in the manner of a conventional multiprocessor system.

The main memory 10 has a plurality of programs including a test program 10A for detecting a hardware failure of an idling CPU.

Figure 2:
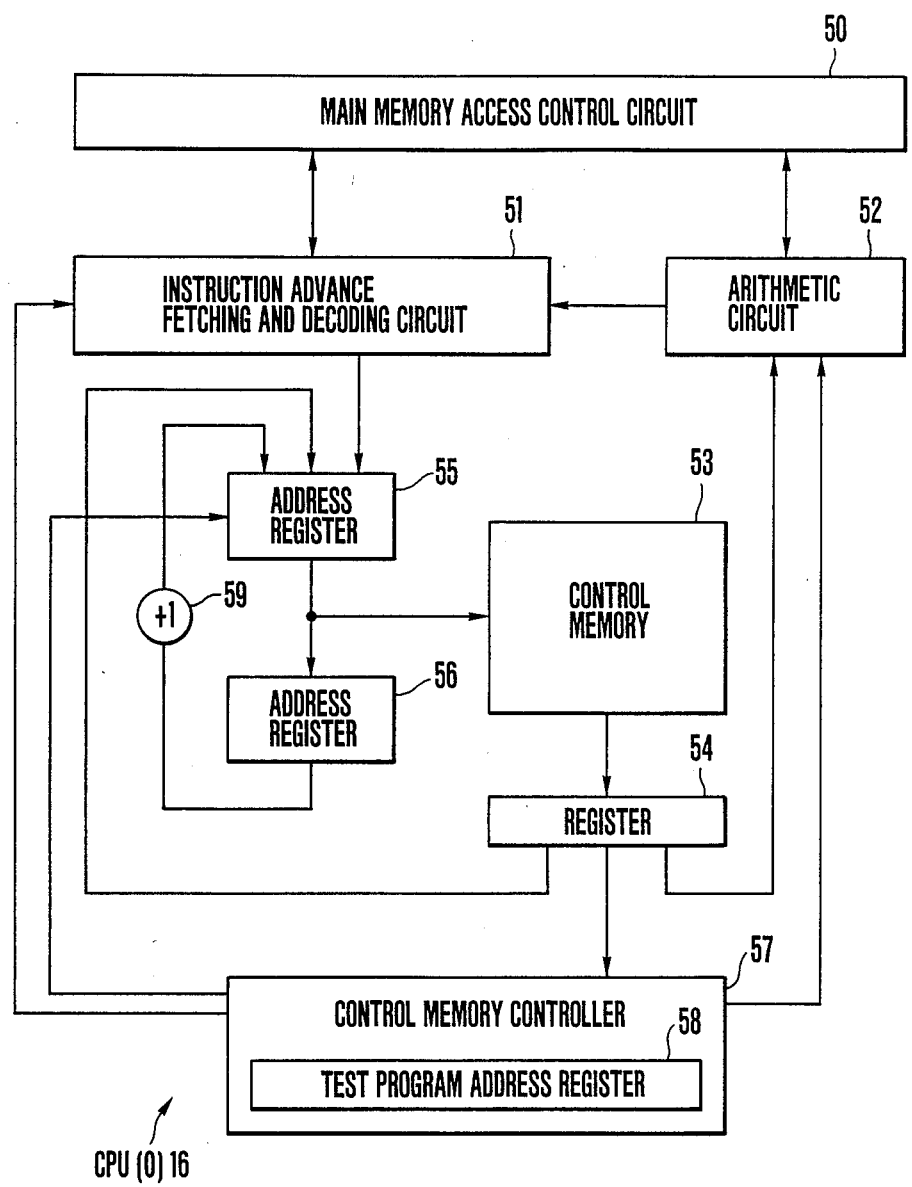
FIG. 2 is a block diagram of the arrangement of a CPU shown in FIG. 1.

FIG. 2 is a block diagram of an arrangement of the CPU (0) 16 shown in FIG. 1. The arrangement of the CPU (1) 17 is identical to that of the CPU (0) 16 and a detailed description thereof is not repeated.

Referring to FIG. 2, the CPU (0) 16 includes a main memory access control circuit 50 for performing access control to the main memory 10 (FIG. 1), an instruction advance fetching the decoding circuit 51 for fetching an instruction in advance and decoding an instruction code, an arithmetic circuit 52 for performing arithmetic operations, a control memory 53 for storing a microprogram, a register 54 for holding the microprogram read out from the control memory 53, an address register 55 for holding an address of the control memory 53, an address register 56 for holding an address preceding the address of the address register 55 by one clock cycle, an adder 59 for incrementing the address from the address register 56 by one, and a control memory controller 57 for decoding an output from the register 54 and for sending a control signal to the arithmetic circuit 52, the instruction advance fetching and decoding circuit 51, and the address register 55. The control memory controller 57 includes a test program address register 58 for storing an address of the test program 10A of the main memory 10.

Figure 3:
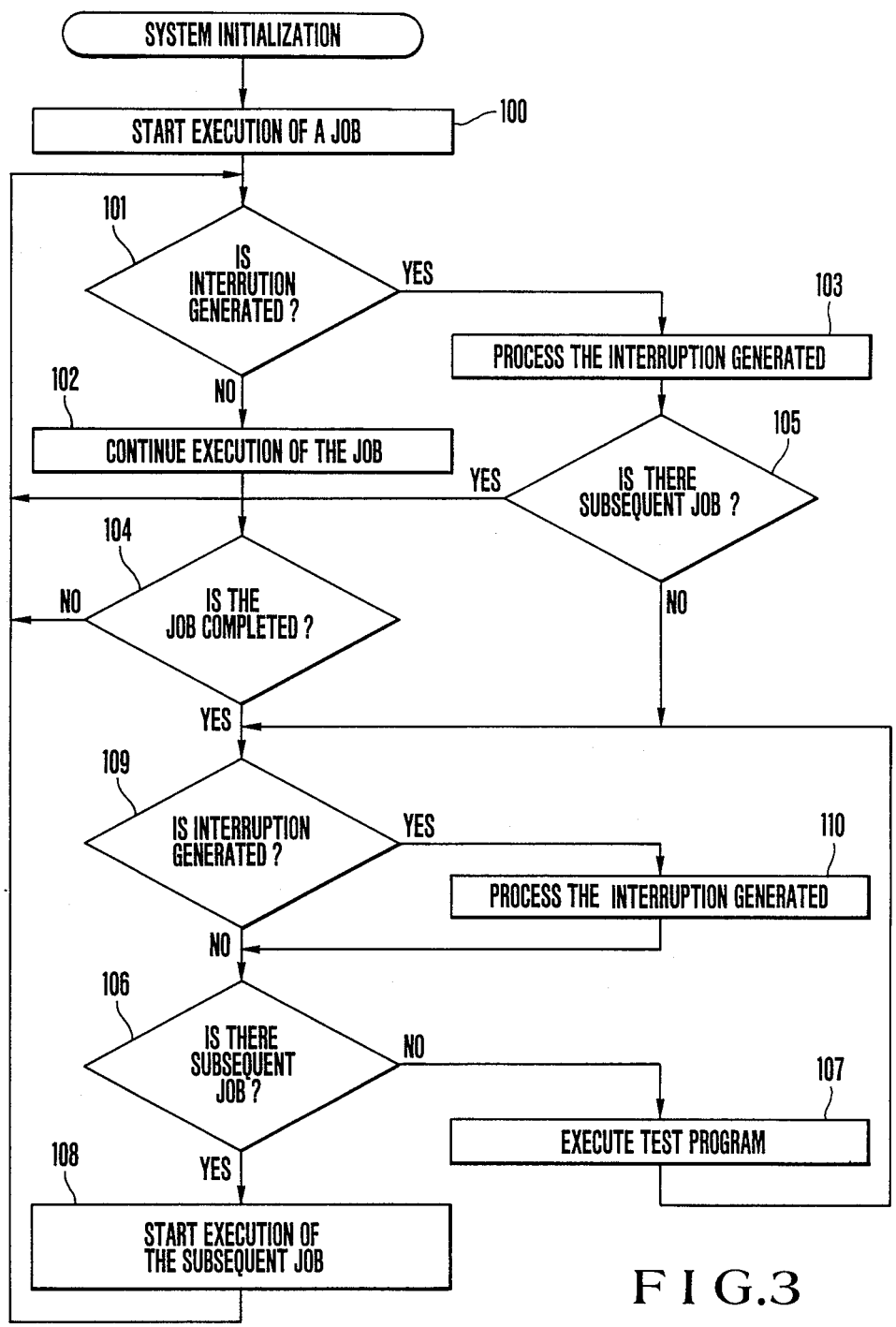
FIG. 3 is a flow chart for explaining the operation of the CPU shown in FIG. 2.

FIG. 3 is a flow chart showing an operation of the CPU (0) 16 for processing a job. More specifically, when initialization of the CPU 16 is completed, execution of a first job is started in step 100. During execution of this job, the system checks in step 101 whether an interruption, e.g., an interruption for acknowledging completion of an input/output operation, is generated. If YES in step 101, the interruption is processed in step 13 and the flow advances to step 105. It is checked in step 105 whether a subsequent job exists. If YES in step 105, the flow returns to step 101; if NO, the flow proceeds to step 109.

On the other hand, if NO in step 101, execution of the job is continued in step 102. When it is determined in step 104 that the job is completed, the flow advances to step 109. It is checked in step 109 whether an interruption is generated. If YES in step 109, the interruption is processed in step 110 and the flow advances to step 106; if NO, the flow directly advances to step 106. It is checked in step 106 whether a subsequent job exists. If YES in step 106, execution of the subsequent job is started in step 108, and the flow jumps to step 101. If NO the step 106, the predetermined test program 10A is read out from the main memory 10 in step 107 and the test program is executed. When execution of the test program is completed, the flow returns to step 109. Execution of the test program is continued until a subsequent job is supplied.

Execution of the test program in step 107 will be described with reference to FIGS. 1 and 2.

Referring to FIG. 2, assume that an instruction read command is set from the control memory controller 57 to the instruction advance fetching and decoding circuit 51 using the address of the test program address register 58. Then, the instruction advance fetching and decoding circuit 51 sends an instruction read request to the main memory access control circuit 50, and the corresponding instruction is read out. The instruction is decoded by the instruction advance fetching and decoding circuit 51, and a corresponding instruction start address of the control memory 53 is supplied to the address register 55. The corresponding instruction is executed in accordance with one or a plurality of microprogram steps of the control memory 53. The instruction is executed by using the register 54. The arithmetic circuit 52, the instruction advance fetching and decoding circuit 51, the main memory access control circuit 50, and so on.

A detection of the idling state of the CPU 16 is executed by a microprogram or hardware of the control memory controller 57.

In FIG. 1, the test program 10A is stored in the main memory 10. However, storage of the test program is not limited to the main memory 10. The test program 10A can be stored in a central processing unit 16 or in 17 or a system control unit 11. Alternatively, a memory means, e.g., a RAM (Random Access Memory), A ROM (Read Only Memory), a floppy disk, and so on can be provided in the service processor 13.

As described above, in this embodiment, when a transition condition from a busy to idling state is detected, the test program 10A of the main memory 10 is executed. When execution of the test program 10A is completed, it is checked whether a subsequent job exists. If a subsequent job exists, the subsequent job is executed. If a subsequent job does not exist, the test program 10A is executed. As a result, a failure is detected at an early stage.

When a failure of the CPU 16 or 17 is detected during execution of the test program 10A, the failed CPU 16 or 17 is separated from the system. Thus, a probability of failure occurrence during execution of a user job is reduced.

Figure 4:
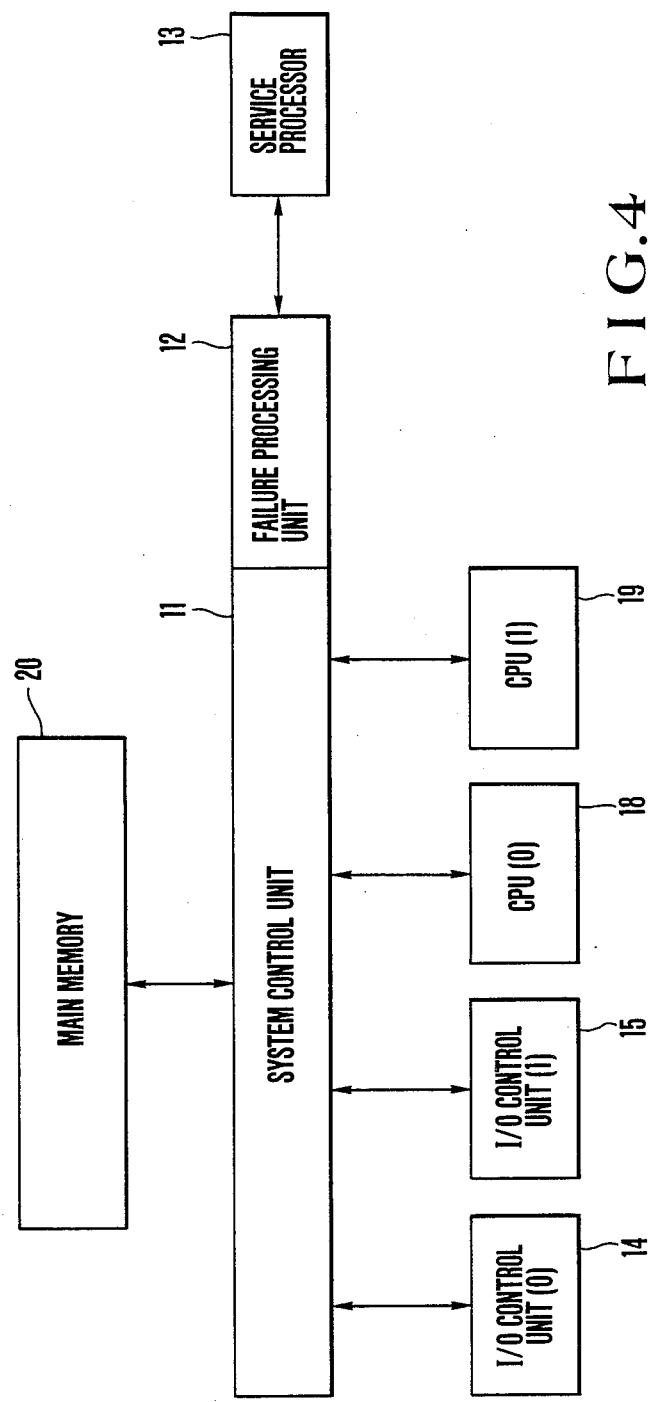
FIG. 4 is a block diagram of an entire arrangement of a system according to another embodiment of the present invention.

FIG. 4 is a block diagram of another embodiment of the present invention. The same reference numerals as in FIG. 1 denote the same portions and a detailed description thereof is not repeated. Referring to FIG. 4, a main memory 20 does not include a test program, unlike the embodiment of FIG. 1.

Figure 5:
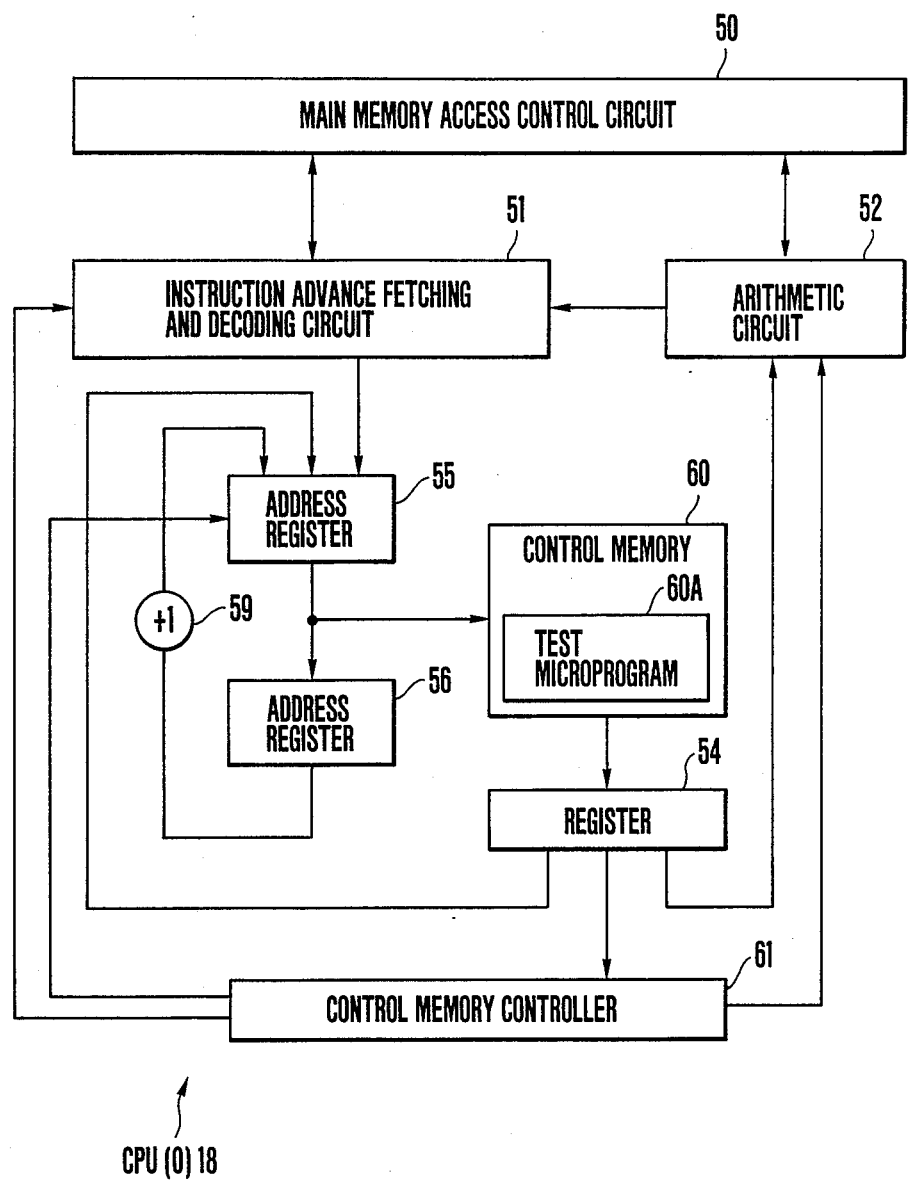
FIG. 5 is a block diagram of the arrangement of a CPU shown in FIG. 4.

FIG. 5 shows an arrangement of a CPU (0) 18 shown in FIG. 4. Referring to FIG. 5, the same reference numerals as in FIG. 2 denote the same portions and a detailed description thereof is not repeated.

Referring to FIG. 5, a control memory 60 includes a test microprogram 60A, and a control memory controller 61 does not require a test program address register corresponding to the test program address register 58 shown in FIG. 2.

Figure 6:
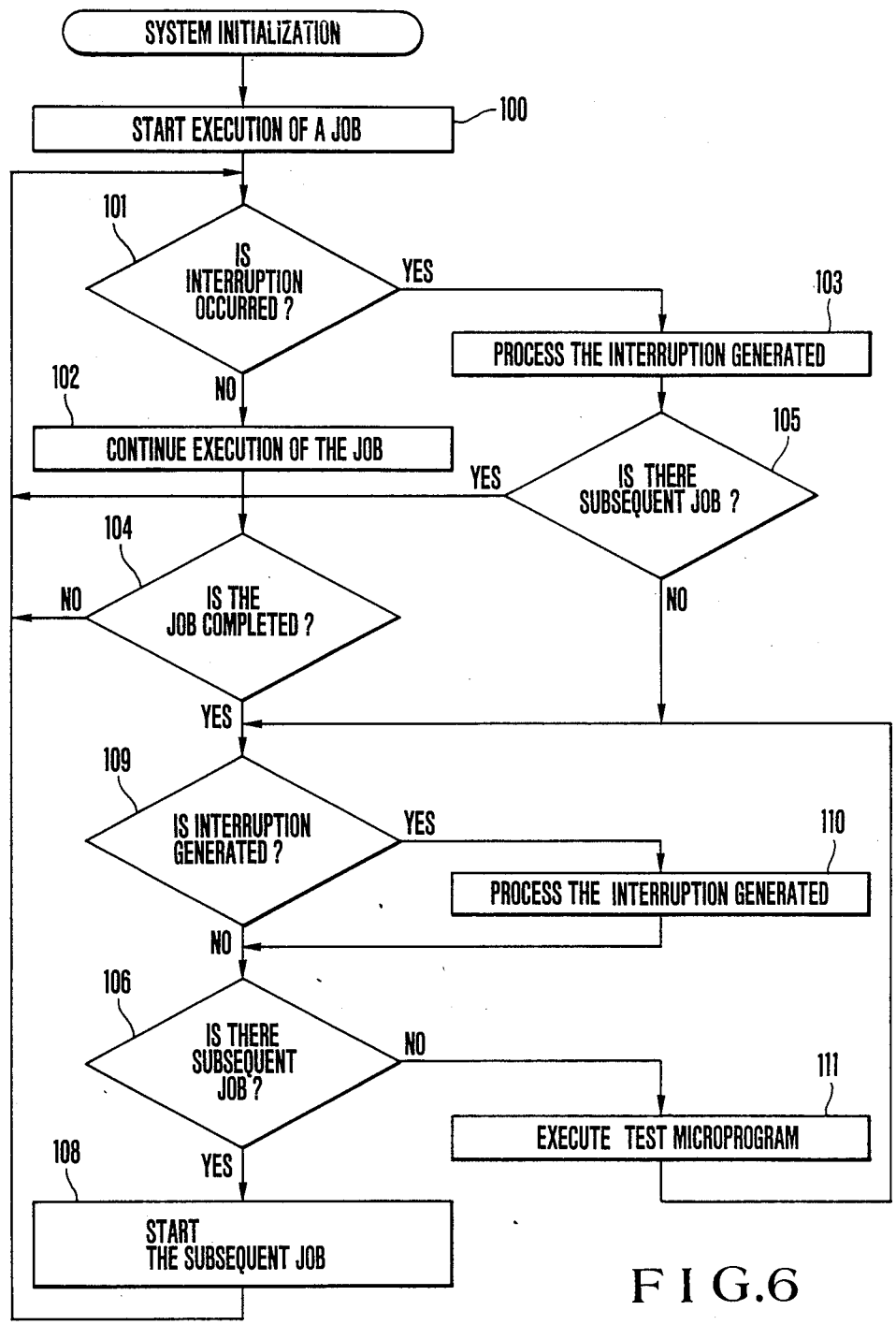
FIG. 6 is a flow chart for explaining the operation of the CPU shown in FIG. 5.

FIG. 6 is a flow chart for explaining the operation of the system shown in FIG. 4. The steps denoted by the same reference numerals as in FIG. 3 represent the same operations and a detailed description thereof is not repeated. In step 111, the predetermined test microprogram 60A is read out from the control memory 60 and is executed. When execution of the test microprogram 60A is completed, the flow returns to step 109. Execution of the test microprogram 60A is continued until a subsequent job is supplied.

Execution of the test microprogram 60A (step 111) of this embodiment will be described with reference to FIGS. 4 and 5.

Referring to FIG. 5, the detection of the idling state is executed by a microprogram or hardware of the control memory controller 61. When a transition condition from busy to idling states is detected, the flow jumps to step 111 to execute the test microprogram 60A of the control memory 60.

When the test microprogram 60A is read out from control memory 60 and executed, a failure of the CPU can be detected at an early stage. All the processing units whose failures are detected during the idling state are separated from the system. As a result, an access contention of the test program stored in the main memory, which is caused by a plurality of idling CPUs, is prevented.

As described above, in this embodiment, when transition conditions from a busy to an idling state are detected, the test microprogram of the control memory is executed. When execution of the test microprogram is completed, the system checks whether a subsequent job exists. If a subsequent job exists, the subsequent job is executed. If a subsequent job does not exist, the test microprogram is executed. As a result, in an idling state, the test microprogram is constantly executed so that a failure can be detected at an early stage.

In addition, when a failure occurs during execution of the test microprogram, the failed CPU is separated from the system. As a result, a probability of failure occurrence during execution of a user job is reduced.

What is claimed is:

1. An early failure detection system for a multiprocessor system having a plurality of central processing units for microprogram control, said early failure detection system comprising:

idle detecting means for detecting that at least one of said plurality of central processing units is idling;

a main memory, commonly connected to said plurality of central processing units, said main memory storing a test program which begins operation when idling of said at least one idling central processing unit is detected by said idle detecting means and which detects a hardware failure of said at least one idling central processing unit before said at least one idling central processing unit becomes busy;

reading means for reading out said test program from said main memory and for executing said test program during idling of said at least one central processing unit; and separating means, responsive to a failure of said at least one idling central processing unit during execution of said test program, for separating all failed central processing units from said multiprocessor system so as to allow at least one remaining central processing unit to operate, thereby maintaining continuous operation of said multiprocessor system.

2. An early failure detection system according to claim 1, wherein each of said plurality of central processing units includes a main memory access control circuit performing access control to said main memory, an instruction advance fetching and decoding circuit fetching an instruction in advance and decoding an instruction code, an arithmetic circuit performing various arithmetic operations, a microprogram control section having a control memory which stores a microprogram, and a control memory controller decoding said microprogram read out from said control memory and sending a control signal to said arithmetic circuit, said idle detecting means, and said reading means.

3. An early failure detection system for a multiprocessor system having a plurality of central processing units for microprogram control, said early failure detection system comprising:

idling detecting means for detecting that at least one of said plurality of central processing unit is idling;

a control memory storing a test microprogram which is started when idling of said at least one central processing unit is detected by said idling detecting means and which detects a hardware failure of said at least one idling central processing unit before said at least one idling central processing unit becomes busy;

reading means for reading out said test microprogram from said control memory and for executing said test microprogram; and separating means for separating all failed central processing units from said multiprocessor system when a failure of said at least one idling central processing unit occurs during execution of said test microprogram to allow at least one remaining central processing unit to operate, thereby maintaining continuous operation of said multiprocessor system.

4. An early failure detection system according to claim 3, wherein each of said plurality of central processing units includes a main memory access control circuit performing access control to said main memory, an instruction advance fetching and decoding circuit fetching an instruction in advance and decoding an instruction code, an arithmetic circuit performing various arithmetic operations, a microprogram control section having a control memory which stores a microprogram including said test microprogram, and a control memory controller decoding said microprogram and sending a control signal to said arithmetic circuit, said idling detecting means, and said reading means.

* * * * *